United States Patent [19]
Larky et al.

[11] Patent Number: 6,092,210
[45] Date of Patent: Jul. 18, 2000

[54] DEVICE AND METHOD FOR SYNCHRONIZING THE CLOCKS OF INTERCONNECTED UNIVERSAL SERIAL BUSES

[75] Inventors: Steven P. Larky, Del Mar; Scott Swindle, San Diego, both of Calif.

[73] Assignee: Cypress Semiconductor Corp., San Jose, Calif.

[21] Appl. No.: 09/173,470

[22] Filed: Oct. 14, 1998

[51] Int. Cl.[7] .................................................. G06F 1/12
[52] U.S. Cl. .......................................... 713/400; 713/600
[58] Field of Search .................................. 713/400, 500, 713/501, 503, 600

[56] References Cited

U.S. PATENT DOCUMENTS

| | | | |
|---|---|---|---|
| 4,866,606 | 9/1989 | Kopetz | 364/200 |
| 4,890,222 | 12/1989 | Kirk | 364/200 |
| 5,388,249 | 2/1995 | Hotta et al. | 395/550 |
| 5,392,421 | 2/1995 | Lennartsson | 395/550 |
| 5,402,394 | 3/1995 | Turski | 368/10 |
| 5,461,723 | 10/1995 | Shah et al. | 395/293 |
| 5,621,902 | 4/1997 | Cases et al. | 395/309 |
| 5,628,001 | 5/1997 | Cepuran | 395/556 |
| 5,630,147 | 5/1997 | Datta et al. | 395/750 |
| 5,642,489 | 6/1997 | Bland et al. | 395/308 |
| 5,675,813 | 10/1997 | Holmdahl | 395/750 |
| 5,748,911 | 5/1998 | Maguire et al. | 395/281 |
| 5,748,923 | 5/1998 | Eitrich | 395/309 |
| 5,754,799 | 5/1998 | Hiles | 395/290 |
| 5,767,844 | 6/1998 | Stoye | 345/212 |
| 5,774,744 | 6/1998 | Story et al. | 395/847 |
| 5,778,218 | 7/1998 | Gulick | 395/558 |
| 5,781,028 | 7/1998 | Decuir | 326/30 |
| 5,918,073 | 6/1999 | Hewitt | 377/47 |
| 5,961,649 | 10/1999 | Khandekar et al. | 713/400 |

OTHER PUBLICATIONS

Universal Serial Bus Specification, Revision 1.0, Jan. 15, 1996, pp. 1–267.
Intel USB Mobile System Design Guidelines, Revision 1.0, Nov. 6, 1996, pp. 1–19.
Universal Serial Bus and the Multimedia PC, by Kosar A. Jaff, 1996, pp. 1–9.
Intel USB Voltage Drop and Droop Measurement, Nov. 18, 1996, pp. 1–19.

*Primary Examiner*—Dennis M. Butler
*Attorney, Agent, or Firm*—Christopher P. Maiorana, P.C.

[57] ABSTRACT

A USB-to-USB connecting device is provided for interconnecting two independent universal serial buses (USBs) and for synchronizing local device clocks to the data streams of both USBs. To interconnect the USBs, the device may include a separate local clock synchronization mechanism for each USB connected to the device. Each separate local clock synchronization may utilize the same reference clock. A method for interconnecting two USBs is also provided.

23 Claims, 2 Drawing Sheets

DEVICE AND METHOD FOR SYNCHRONIZING THE CLOCKS OF INTERCONNECTED UNIVERSAL SERIAL BUSES

BACKGROUND OF THE INVENTION

This invention relates generally to a device or apparatus for interconnecting electrical buses having independent clocks and in particular to a device for interconnecting two Universal Serial Buses (USBs) and for synchronizing independently to both of the clocks of the two buses.

A typical personal computer system has a main central processing unit (CPU) enclosed within a housing and one or more peripheral devices, such as a keyboard, a mouse, a monitor, a modem or a printer connected to the housing and electrically connected to the CPU by a unique connector and an electrical bus, respectively. These different connectors and electrical buses include serial buses, parallel buses and RS-232 ports. Typically, each of these different buses has different signaling requirements and different connectors to the housing. For example, a parallel bus has a certain physical connector and communicates bits of data in parallel (i.e., a predetermined number of bits at the same time). In contrast, a serial bus may have a different physical connector and may transmit bits of data in a serial manner (i.e., one bit at a time).

In order to connect a keyboard, printer, monitor, modem or mouse to the personal computer, it was often necessary to use several different types of local electrical buses and associated ports, such as a serial port for a modem, a parallel port for the printer, a keyboard port and a mouse port. This led to unnecessary complexity since each peripheral device may use a different bus. Therefore, a new universal serial bus (USB) was created to make the task of connecting peripheral devices to the computer easier. The USB replaces the multiple cables and multiple physical connectors typically needed with a single standardized connection system. The USB also permits peripheral devices to be connected and/or disconnected from the bus while the computer system is powered up, which eliminates the need with conventional buses to shut down and "re-boot" the computer every time that a peripheral device is connected or disconnected. The USB also permits a peripheral connected to the USB to be detected and then a configuration process for the device, known as enumeration, may be commenced.

Although the USB is typically used to connect peripherals to a computer, it is also possible to use the USB to communicate data between computers. Using the USB ports of two personal computers, it is possible and desirable to permit the two personal computers to be connected and to communicate with each other over the interconnected USBs. To accomplish this objective, it is necessary to provide a USB-to-USB connecting device which interfaces between the two USBs, and thus has two USB interface circuits. One of the key requirements for a USB interface is that it must be able to synchronize its own local clock to the data stream (and hence the USB clock) it receives over the USB. For a typical USB interface, the synchronization of the local clock to the data stream is not difficult to accomplish. In the USB specification, a digital phase locked loop may be used to synchronize the local clock to the data stream.

However, for a USB-to-USB connecting device which interconnects two USBs, the synchronization poses a problem. In particular, because the USB bus is intended to connect peripherals to a single computer, each USB may have its own independent clock which runs at the same approximate frequency (about 12 MHz), as defined by the USB specification, but which may be slightly different from all other USB clocks due to data jitter, clock phase differences and/or clock frequency variations. Therefore, since each of the USB buses connected to the USB-to-USB device are independent and may have a slightly different clock, there must be two separate synchronization mechanisms in order to ensure that the proper synchronization to both independent clocks occurs.

Thus, it is desirable to provide a device and method for interconnecting two independent USBs together in which the device synchronizes itself to the independent clocks of both USBs so that data may be communicated over the USBs, and it is to this end that the present invention is directed.

SUMMARY OF THE INVENTION

In accordance with the invention, a USB-to-USB connecting device is provided in which the device may interconnect a first USB associated with a first computer and a second USB associated with a second computer to permit the two computers to communicate with each other over the USBs which are usually used to connect a computer to its peripheral devices. To accomplish this, the device may include a first synchronization device for synchronizing a first local clock to the data stream of the first USB, and a separate second synchronization device for synchronizing a second local clock to the data stream of the second USB, so that the device independently synchronizes to the data streams of both USBs. To perform the synchronization, the device may include a reference clock signal generator which feeds a single reference clock signal to both of the synchronization devices in order to generate the first and second local clock signals synchronized to the respective data streams. The device may also include a first and a second decoder for decoding the incoming data streams from each USB using the first and second local clock signals. Thus, in accordance with the invention, the USB-to-USB connecting device may use a single reference signal to synchronize to both of the data streams of the USBs.

The reference clock generator may be a clock crystal. In accordance with another embodiment of the invention, the reference clock generator may include the clock crystal and an analog phase locked loop (PLL) for multiplying the reference clock signal from the crystal to the desired frequency. Each synchronization device may be a digital PLL.

Thus, in accordance with the invention, a device for interconnecting a first and a second universal serial bus (USB) which has the ability to synchronize itself to the data stream of both USBs is provided. The device has a first USB interface connected to the first USB for receiving a first data stream and a second USB interface connected to the second USB for receiving a second data stream. The device may produce a reference clock signal and include a first synchronization device for synchronizing a first local clock of the first USB interface to the data stream of the first USB using the reference clock signal and a second synchronization device for synchronizing a second local clock of the second USB interface to the data stream of the second USB using the reference clock signal so that the first and second local clocks of the device are synchronized to two independent data streams.

DETAILED DESCRIPTION OF A PREFERRED EMBODIMENT

The invention is particularly applicable to a universal serial bus-to-universal serial bus device (USB-to-USB connecting device) for interconnecting two computers and for synchronizing to both USBs and it is in this context that the invention will be described. It will be appreciated, however, that the device and method in accordance with the invention has greater utility.

Figure 1:
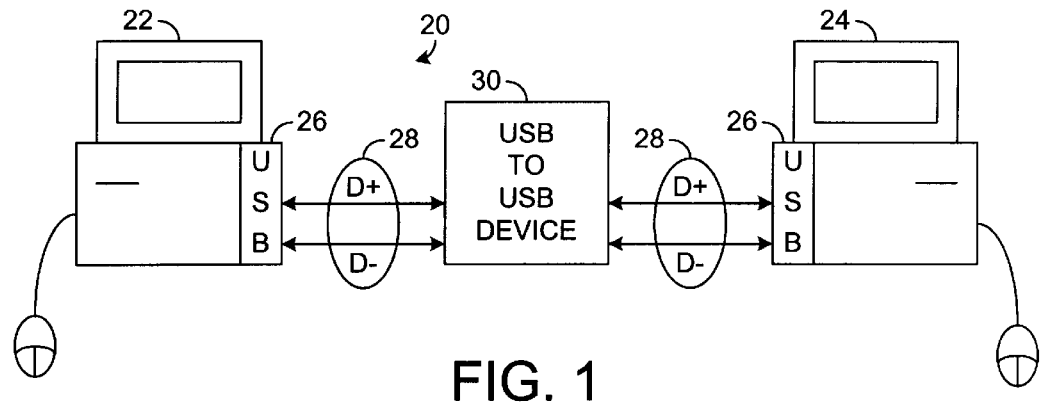
FIG. 1 is a diagrammatic view illustrating two computers interconnected to each other using two USBs and a USB-to-USB connecting device in accordance with the invention.

FIG. 1 is a diagram of a networking system 20 in which a first personal computer 22 and a second personal computer 24 are interconnected to each other by a universal serial bus. In more detail, each computer 22, 24 may include a universal serial bus (USB) port 26 which interfaces the computer to a USB bus 28 which includes at least a D+ signal line and a D− signal line as is well known. In order to connect the two computers 22, 24 to each other using their USBs, it is necessary to provide a USB-to-USB connecting device 30 which interconnects the USBs from each computer. As will be described, the resulting system permits the computers to communicate with each other over the USBs which is convenient since the USB provides a standard interconnect path and most new computers include a USB port.

In order to interconnect the two computers 22, 24 together, the USB-to-USB connecting device 30 must include two USB interface circuits which, respectively, interface to the USB of each computer. In addition, each USB interface must synchronize its own local clock, as described below, to the incoming USB data stream and the USB clock of its respective USB bus. Because the two USBs connected to the USB-to-USB connecting device are operating asynchronously and independently of each other as described above (i.e., they do not have a common clock), the USB-to-USB connecting device must have two USB interface circuits. Each USB interface circuit must therefore independently synchronize its local clock to the USB bus which is connected to it. A USB-to-USB connecting device in accordance with the invention which accomplishes this will now be described.

Figure 2:
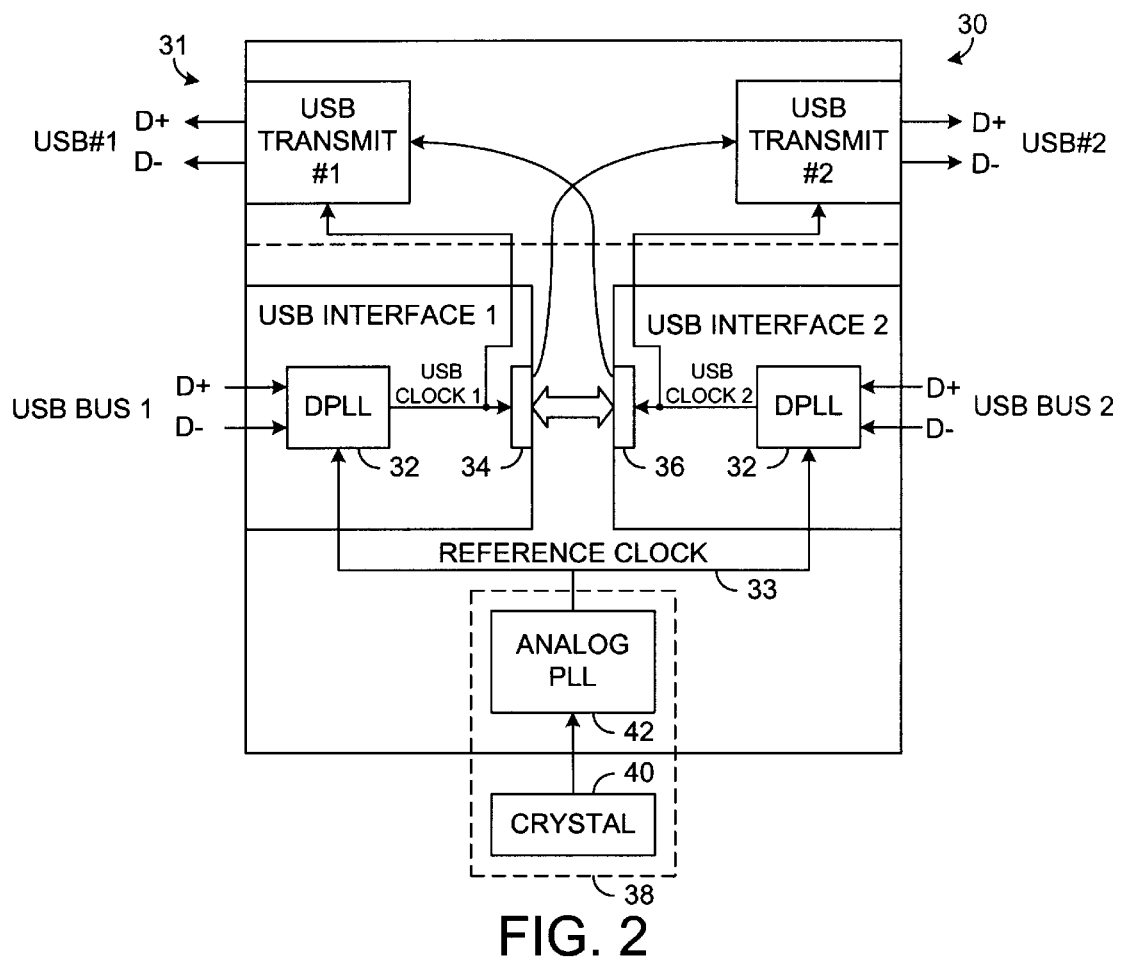
FIG. 2 is a diagram illustrating more details of the USB-to-USB connecting device in accordance with the invention.

FIG. 2 is a diagram illustrating more details of the USB-to-USB connecting device 30 in accordance with the invention. As shown, the USB-to-USB connecting device may include a first USB interface circuit (USB Interface 1) and a second USB interface circuit (USB Interface 2) which interface with a respective incoming USB bus (USB Bus 1 and USB Bus 2). As described above, each USB interface circuit must synchronize its local clock to the data stream on the USB bus. Because the two USB buses are independent (i.e., they do not share a common clock), each USB interface circuit must synchronize itself to its own USB data stream. Each USB interface may both receive and transmit USB data. However, for purposes of describing the USB communications process, a separate receive section and transmit section 31 are shown. For incoming data on the USB #1 bus destined for the USB #2 bus, the receive section may 1) receive the incoming data and detect data transitions; 2) synchronize its local clock to the data stream as described below; and 3) decode the incoming data to generate a data stream. The data stream may then be passed onto the USB Transmit #1 apparatus which, using the local clock generated by the USB Interface 1, encodes the data and sends the data over USB #2 bus. A similar process may be used to communicate data from USB #2 to USB #1.

To permit each USB interface to synchronize its local clock to its respective incoming data stream with an asynchronous clock, each USB interface circuit may include a separate synchronization device 32. Each synchronization device receives an incoming USB data stream, detects data transitions in order to determine the clock of the data stream and synchronizes its local clock to the data stream clock to permit the USB data to be decoded. In one embodiment of the invention, each synchronization device 32 may be a digital phase locked loop (DPLL). The invention, however, is not limited to a DPLL and may use any other circuit which permits the USB interface to synchronize its local clock to the data stream of the incoming USB, such as an analog phase locked loop.

Each synchronization device 32 may use a common reference clock 33 which oversamples the data on its corresponding USB bus (i.e., the reference clock has a higher frequency than the data on the USB bus). At the oversampled frequency, the incoming data stream may be sampled in order to detect, with some predetermined level of accuracy, data transitions on the USB bus. Each synchronization device may then use the detected transitions to generate a local USB clock (USB Clock 1 and USB Clock 2, respectively) which is synchronized to the incoming data stream on the USB bus. Each local USB clock (USB Clock 1 and USB Clock 2, respectively) may then be fed into an associated first and second USB decoder 34, 36 which decodes the data streams on the respective USB buses using the corresponding local USB clocks. Thus, each decoder receives its own independent local USB clock with permits each decoder to decode its USB data stream. Once the data stream have been decoded, the data may be exchanged with the other USB interface circuit which communicates the data to the other computer. In this manner, the computers shown in FIG. 1 may communicate with each other over the USBs.

As described above, although two separate local USB clocks are generated, a single reference clock signal may be used for both USB clocks. The single reference clock 33 may be generated by a reference clock generator 38. In one embodiment, the reference clock generator may include a crystal 40 which generates the reference clock signal 33. In another embodiment, the reference clock generator may also include, in addition to the crystal 40, a frequency multiplier means 42, such as an analog PLL, which multiplies the frequency of the signal generated by the crystal until the desired frequency of the reference clock signal 33 is achieved.

In more detail, each synchronization circuit 32, shown as a DPLL in the embodiment of FIG. 2, runs at the oversampled rate of the local reference clock signal, which may be 48 MHz for example, and looks for transitions on the USB bus to produce the local USB clock which may be approximately 12 MHz for a typical USB bus. The local USB clock may be synchronized to the data stream on the USB bus so that a decoder 34, 36 may decode the data in the data stream. The frequency and phase of each local USB clock can be continuously adjusted, as is well known, in order to maintain the correct timing relationship with the data stream on the USB bus since the data stream is prone to data jitter and clock phase shifts. The DPLL is preferably designed to withstand the data jitter and clock phase shifts so that the local USB clock will register the data as close to mid-bit as possible. The end result is that the number of clock edges on the local USB clock should coincide with the same number of data bits in the incoming USB data stream. To adjust for the fact that either the local USB bus or the USB bus clock may be running behind (i.e., at a slower frequency), the synchronization device will adjust the local USB clock accordingly by occasionally lengthening or shortening the local USB clock cycle at the appropriate time to slow down or catch up, respectively, to the USB bus clock. Now, a method for synchronizing a USB-to-USB connecting device to two independent USB bus clocks will be described.

Figure 3:
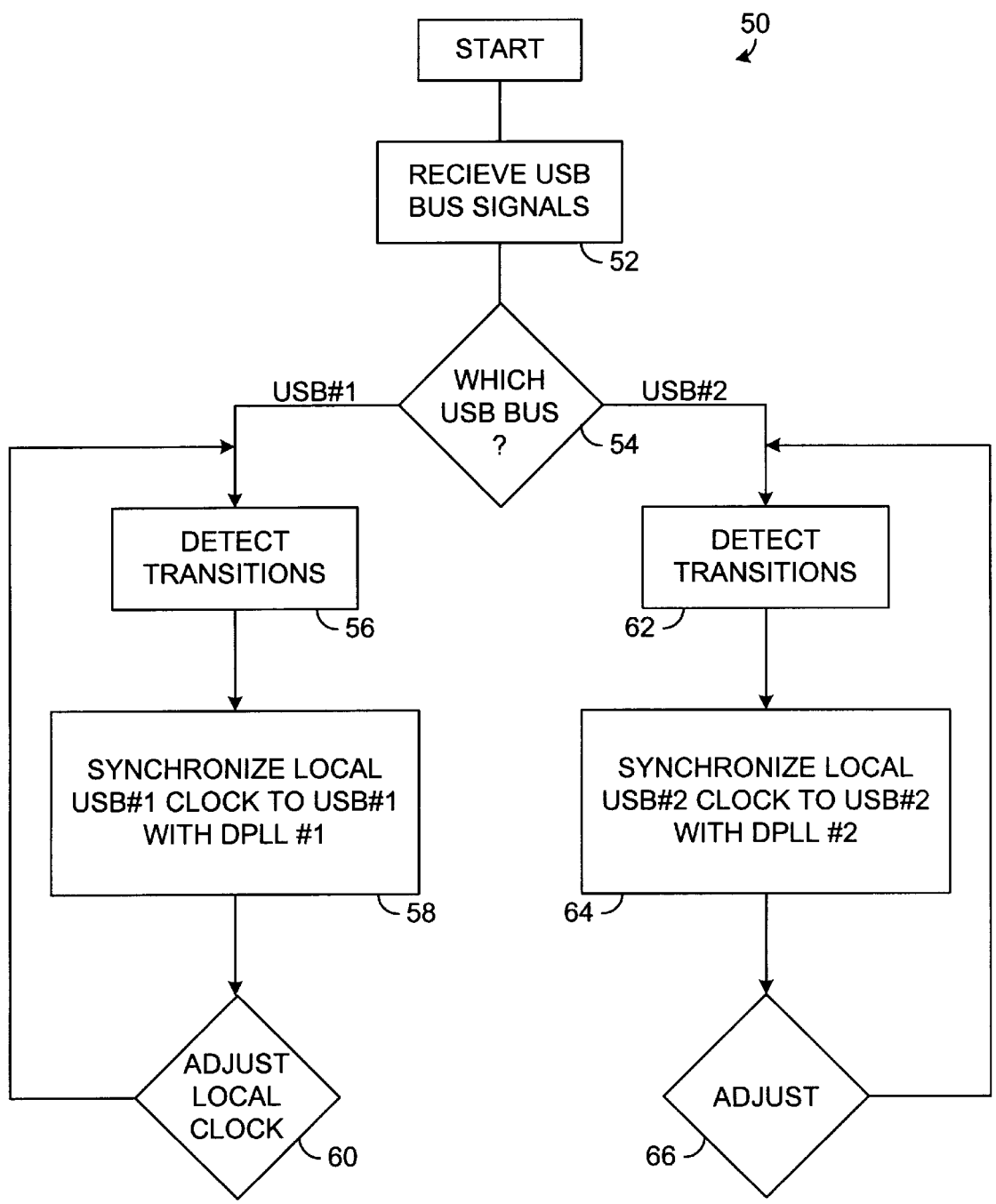
FIG. 3 is a flowchart illustrating a method for synchronizing a USB-to-USB connecting device to two different USBs in accordance with the invention.

FIG. 3 is a flowchart illustrating a method 50 for synchronizing a USB-to-USB connecting device to two incoming data streams in accordance with the invention. First, in step 52, an incoming data stream from either or both of the USB buses is received. In accordance with the invention, data streams from both USBs may be received and processed simultaneously. Next, in step 54, an incoming data stream is fed to the appropriate USB bus interface. If the data stream is on USB #1 (See FIG. 2), then in step 56, the USB bus interface, and in particular the synchronization device, detects signal transitions in the data stream. Next, in step 58, the synchronization device, using the reference clock signal, synchronizes its local USB clock 1 to the incoming data stream. In this example, the synchronization device may be a digital phase locked loop (DPLL). Next, in step 60, the synchronization device adjusts the local USB clock signal for data jitter and phase shifts until the data stream is completed. As described above, to adjust the local USB clock signal, the local USB clock transitions may be lengthened or shortened depending on the adjustment necessary. After step 60, the method loops back to step 56 to synchronize the local USB clock with the next data stream. In this manner, the local USB clock is continuously adjusted based on changes in the USB data stream. Similarly, and possibly simultaneously with the synchronization to the incoming data stream from USB #1, the other synchronization device may synchronize itself to the data stream from USB #2. Thus, in step 62, transitions in the data stream on the USB #2 bus are detected and in step 64, local USB clock #2 is synchronized to the data stream using the reference clock signal. In step 66, the local USB clock 2 is adjusted for data jitter and phase shifts as described above. Thus, in accordance with the invention, the USB-to-USB connecting device can synchronize itself to two independent USB data streams.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A device for interconnecting a first and a second universal serial bus (USB), the device having the ability to synchronize to the data stream of the USBs, the device comprising:
    a first USB interface connected to the first USB for receiving a first data stream, the first interface having a first local clock;
    a second USB interface connected to the second USB for receiving a second data stream, the second interface having a second local clock;
    means for producing a reference clock signal;
    a first synchronization device for synchronizing the first local clock of the first USB interface to the data stream of the first USB using the reference clock signal; and
    a second synchronization device for synchronizing the second local clock of the second USB interface to the data stream of the second USB using the reference clock signal so that the first and second local clocks of the device are synchronized to two independent data streams.

2. The device of claim 1, wherein the first and second synchronization devices comprise digital phase locked loops.

3. The device of claim 2, wherein the first and second synchronization devices further comprise means for adjusting the frequency of the local clocks in response to changes in the data stream.

4. The device of claim 3, wherein the adjusting means comprises means for changing the length of the local clock cycle.

5. The device of claim 3 further comprising a first decoder connected to the first interface for decoding the first data stream based on the first local clock and a second decoder connected to the second interface for decoding the second data stream based on the second local clock.

6. The device of claim 1, wherein the first and second synchronization devices comprise analog phase locked loops.

7. The device of claim 1, wherein the reference clock signal producing means comprises a crystal for generating the reference clock signal.

8. The device of claim 7, wherein the reference clock signal producing means further comprises means for multiplying the frequency of the reference clock signal generated by the crystal to generate a higher frequency reference clock signal.

9. The device of claim 8, wherein said multiplying means comprises an analog phase locked loop.

10. An apparatus for interconnecting a first and a second computer together, the first computer having a first universal serial bus connected to a first universal serial bus port and the second computer having a second universal serial bus connected to a second universal serial bus port, the apparatus comprising:
    a connecting device interconnecting the first and second universal serial bus in order to permit the first and second computer to communicate with each other over the universal serial buses, the connecting device comprising
    a first USB interface connected to the first USB for receiving a first data stream, the first interface having a first local clock;
    a second USB interface connected to the second USB for receiving a second data stream, the second interface having a second local clock;
    means for producing a reference clock signal;
    a first synchronization device for synchronizing the local clock of the first USB interface to the data stream of the first USB using the reference clock signal; and
    a second synchronization device for synchronizing the local clock of the second USB interface to the data stream of the second USB using the reference clock signal so that the first and second local clocks of the device are synchronized to two independent data streams.

11. The apparatus of claim 10, wherein the first and second synchronization devices comprise digital phase locked loops.

12. The apparatus of claim 11, wherein the first and second synchronization devices further comprise means for adjusting the frequency of the local clocks in response to changes in the data stream.

13. The apparatus of claim 12, wherein the adjusting means comprises means for changing the length of the local clock cycle.

14. The apparatus of claim 12 further comprising a first decoder connected to the first interface for decoding the first data stream based on the first local clock and a second decoder connected to the second interface for decoding the second data stream based on the second local clock.

15. The apparatus of claim 10, wherein the first and second synchronization devices comprise analog phase locked loops.

16. The apparatus of claim 10, wherein the reference clock signal producing means comprises a crystal for generating the reference clock signal.

17. The apparatus of claim 16, wherein the reference clock signal producing means further comprises means for multiplying the reference clock signal generated by the crystal to generate a higher frequency reference clock signal.

18. The apparatus of claim 17, wherein said multiplying means comprises an analog phase locked loop.

19. A method for synchronizing a device to data stream from a first and second universal serial bus (USB), the method comprising:

receiving a first data stream at a first USB interface, the first interface having a first local clock;

receiving a second data stream at a second USB interface, the second interface having a second local clock;

generating a reference clock signal;

synchronizing the local clock of the first interface to the data stream of the first USB using a first synchronization device driven by the generated reference clock signal; and synchronizing the local clock of the second interface to the data stream of the second USB using a second synchronization device driven by the generated reference clock signal so that the first and second local clocks of the device are synchronized to two independent data streams.

20. The method of claim 19, wherein using the first and second synchronization devices further comprise adjusting the frequency of the local clocks in response to changes in the data stream.

21. The method of claim 20, wherein adjusting comprises changing the length of the local clock cycle.

22. The method of claim 20 further comprising decoding the first data stream based on the first local clock and decoding the second data stream based on the second local clock.

23. The method of claim 22, wherein generating the reference clock signal further comprises multiplying the reference clock signal generated by the crystal to generate a higher frequency reference clock signal.

* * * * *